O. GILMORE.
Water Meter.

No. 98,686.                              Patented Jan. 11, 1870.

United States Patent Office.

OTHNIEL GILMORE, OF RAYNHAM, MASSACHUSETTS.

Letters Patent No. 98,686, dated January 11, 1870.

IMPROVEMENT IN WATER-METERS.

The Schedule referred to in these Letters Patent and making part of the same.

*To all whom it may concern:*

Be it known that I, OTHNIEL GILMORE, of Raynham, in the county of Bristol, and State of Massachusetts, have invented Improvements in Water-Meters; and I do hereby declare that the following, taken in connection with the drawings which accompany and form part of this specification, is a description of my invention, sufficient to enable those skilled in the art to practise it.

United States Letters Patent, No. 87,837, were granted to me, March 16, 1869, on an improved water-meter, in which Letters Patent there are shown and claimed flexible tubes, (having pinching-rolls acting thereon, and operated by the current passing through the tubes,) the tubes being so arranged as to have upon them the pressure of water both inside and out.

My present improvement has relation to details or modifications of construction of a meter embodying said patented invention.

In such patented meter, the tubes employed were seamless, and were normally expanded, and under the repeated action of the rolls in collapsing them, they soon cracked at the fold produced by the collapse.

By experiment I have ascertained, that by using leather hose or pipe, made of two pieces, seamed or stitched together, so that the pipe is normally collapsed, and is expanded by the currents of water, this difficulty is wholly obviated, the leather or flexible tubing being subjected to no strain when collapsed, and only to the pressure of the water when expanded.

My invention consists, primarily, in the employment of leather or other flexible pipes, made of pieces thus seamed or stitched together at their edges.

In my meter, made as shown in my said patent, the pipes were always expanded throughout their length, by the pressure of the head of water, except at the immediate points where pinched by the rolls. As each roll, in passing on to the inlet-end of the pipe, had to strike and compress the expanded pipe, the friction and resistance were too great to permit the rolls to work easily, and to perfectly collapse the pipes. In my improved construction, I employ a valve, to control the flow of water from the supply-pipe into the meter-pipe, and so arrange the valve-mechanism that the flow of water into the meter-pipe is cut off after the roll leaves the outlet-end of the pipe, until the roll has moved far enough over the induction-end of the pipe to allow inrushing water to flow freely behind it, so as to exert its pressure upon it. This constitutes the second part of my present invention.

The drawings represent a meter embodying the improvements.

A shows a section on the line $x\ x$.

B, a section on the line $z\ z$.

$a$ denotes the meter-case.

$b$, the inlet or supply-pipe, leading into a valve-cylinder, $c$.

$d$, the outlet-pipe, leading directly from the meter-chamber.

$e\ f$ denote the flexible meter-tubes.

Each tube $e\ f$ is composed of two strips of leather or other suitable practically impervious material, which, being laid flatwise together, are stitched through, as shown at C.

Each tubular piece so made, is laid upon a flexible band, $g$, extending around the inner surface of the case, and the band and tube are fastened to such inner surface, so that one end of each tube opens into the meter-chamber, while the other end of each is coupled to a nipple, $h$, at the side of the valve-cylinder $c$, in which plays a valve-piston, $i$.

The outlet-pipe communicates with the valve-chamber or cylinder through a valve-port, $k$, as seen at B, and from the valve-chamber two eduction-ports, $l\ m$, lead, one into each nipple $h$ of the flexible meter-tubes.

The valve-piston has two valves, $n\ o$, fitting to the cylinder, and enclosing between them a water-space, $p$, into which the inlet-port $k$ opens.

The piston is connected, by a piston-rod, $q$, to an eccentric, $r$, on a central shaft, $s$, carrying radial arms $t$, at the outer end of each of which is pivoted a lever, $u$, one arm of which carries a roll, $v$, held up against one of the flexible meter-tubes by the stress of a spring, $w$, upon the other arm, as seen at B.

One roll bears upon the tube $e$, while another, preferably arranged diametrically opposite thereto, bears upon the other tube $f$.

The operation of the meter is as follows:

Suppose the outer eduction-port to be open. Water will rush through it into the meter-tube connected therewith, and the pressure of the water will drive the roll upon such tube around the wall of the meter-chamber, forcing all the water in front of the roll out of the tube (as the roll advances) into the meter-chamber.

As the roll nears the mouth of the tube, the rotation of the eccentric, imparting movement to the piston-rod and valve-piston, causes the outer valve to cover up the valve-port, and the inner valve to uncover the port leading into the other meter-tube. But before one port is thus covered and the other uncovered by the respective valves, the rotation of the shaft will have carried the roll of the tube to be next emptied and filled, well on to the tube, as seen at B, so that no water flows into such tube until the roll is brought well into position (before the pressure of the inrushing current of water commences) to cut off the outgoing steam from the inrushing stream.

Thus organized, the meter is very accurate in its action, is very enduring, and is not liable to get out of order.

As in my aforesaid patented meter, it will be ascertained by experiment how much fluid will be delivered from the flexible pipe, or the assemblage of flexible pipes, at each rotation of the frame carrying the pinching-rolls, which act as stop-valves to the current through the pipe or pipes, and then, by any suitable counter-mechanism, coupled with the shaft $i$, to register the number of its rotations, the quantity of fluid passing through the meter can be readily ascertained.

I claim—

In combination with the pinching-rolls, flexible meter-tubes, which are normally collapsed, and are only expanded by the pressure of the water.

Also, in combination with the flexible meter-tubes and pinching-rolls, the valve-cylinder and valves, arranged to operate substantially as described.

OTHNIEL GILMORE.

Witnesses:
J. B. CROSBY,
C. WARREN BROWN.